Sept. 24, 1940.                    G. MAYES                       2,215,793
                          INTERNAL COMBUSTION ENGINE
                            Filed Nov. 29, 1938           4 Sheets-Sheet 2
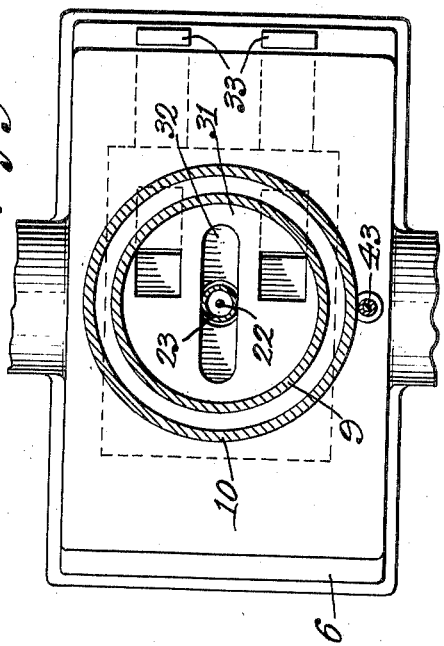
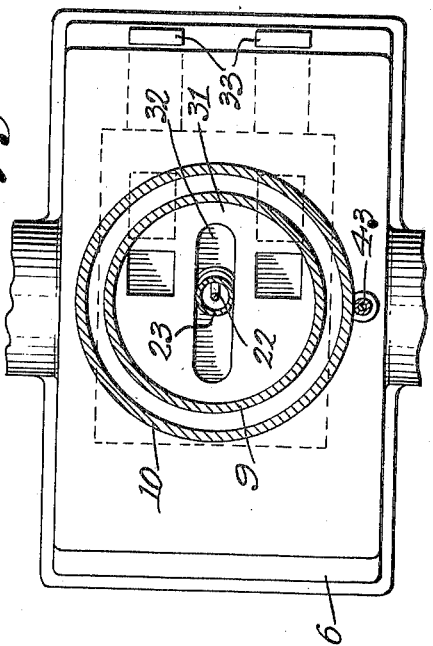
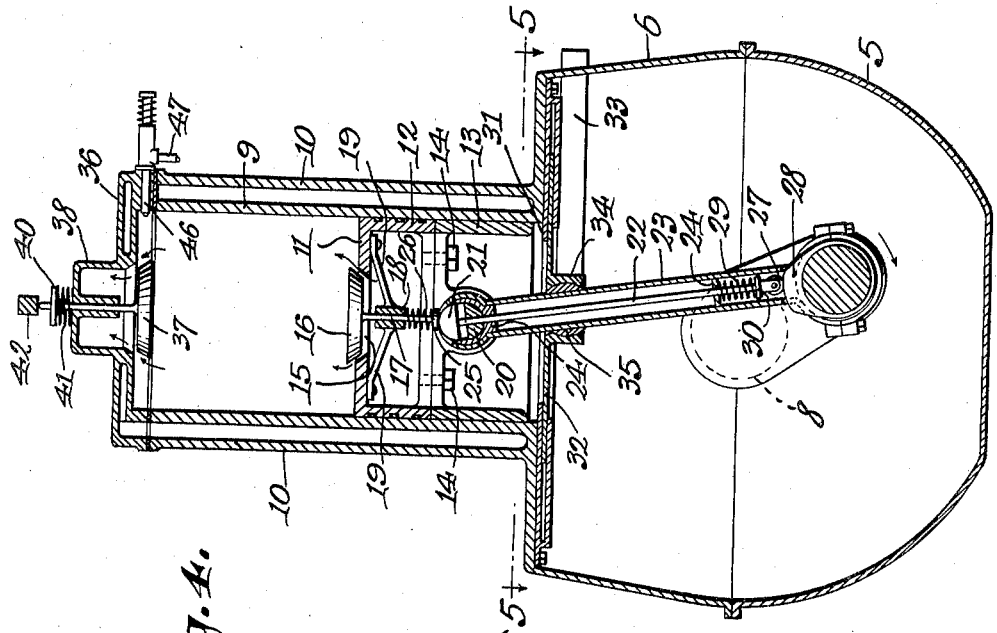
Graham Mayes INVENTOR.
BY C. A. Snow & Co.
ATTORNEYS.

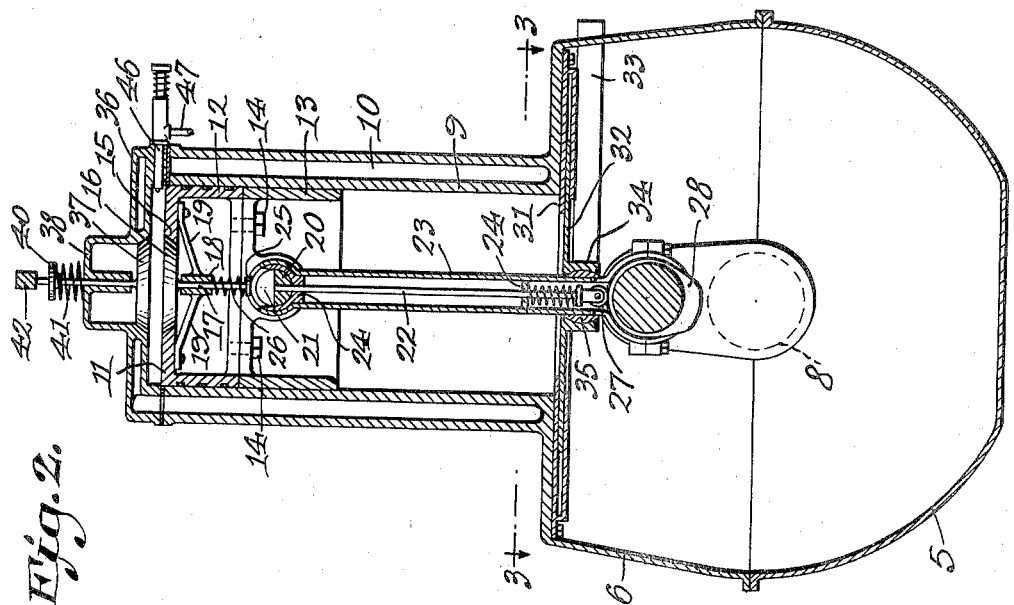

Sept. 24, 1940.　　　　G. MAYES　　　　2,215,793
INTERNAL COMBUSTION ENGINE
Filed Nov. 29, 1938　　　4 Sheets-Sheet 3
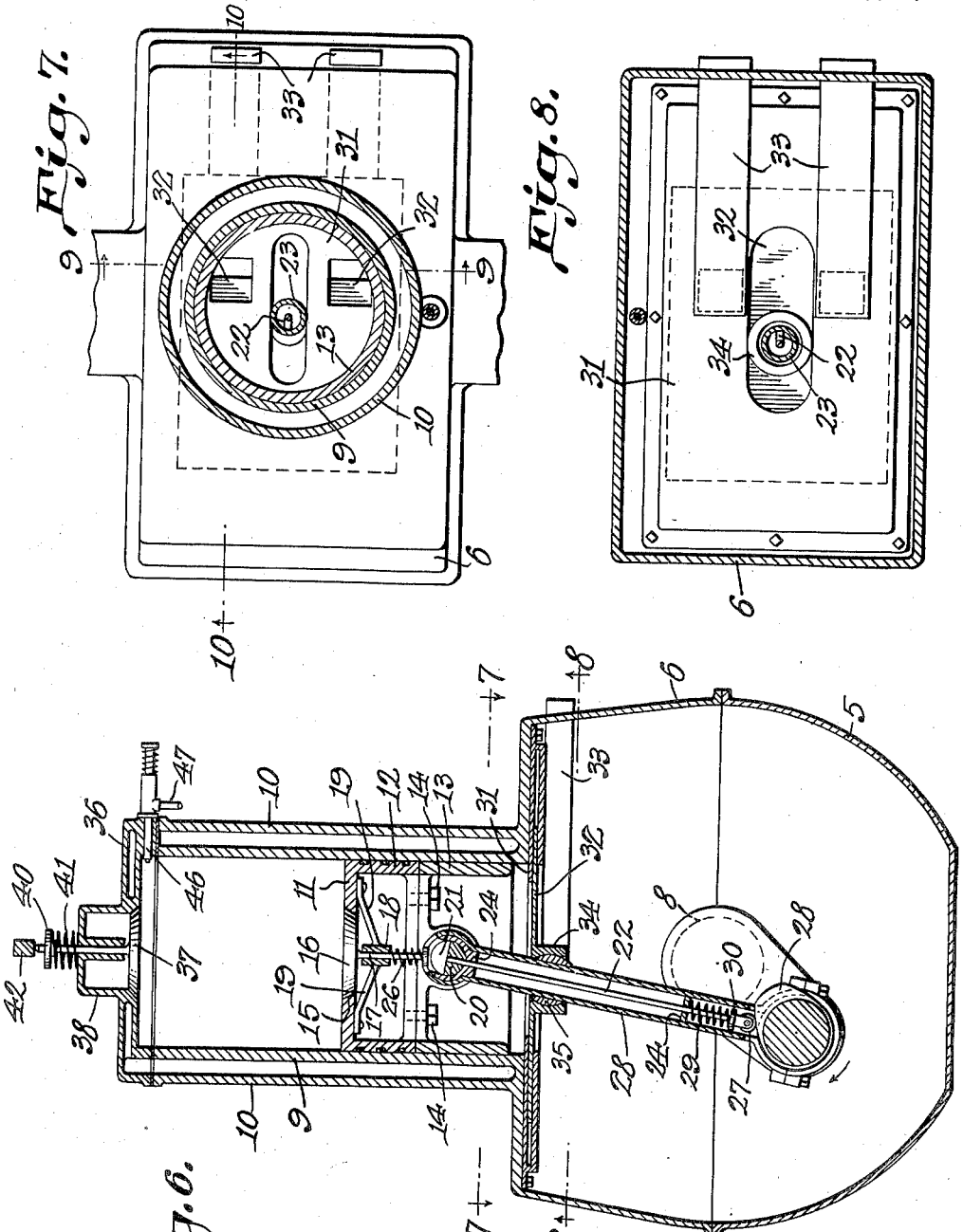
Graham Mayes INVENTOR.
BY
ATTORNEYS.

Sept. 24, 1940.　　　　　G. MAYES　　　　　2,215,793
INTERNAL COMBUSTION ENGINE
Filed Nov. 29, 1938　　　4 Sheets-Sheet 4
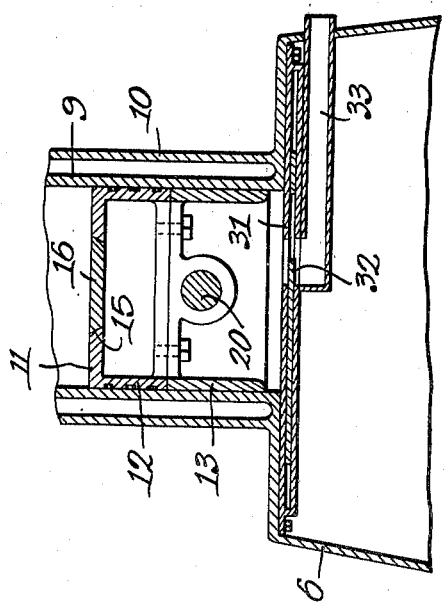
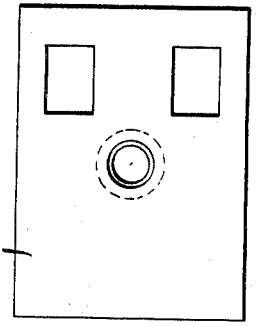
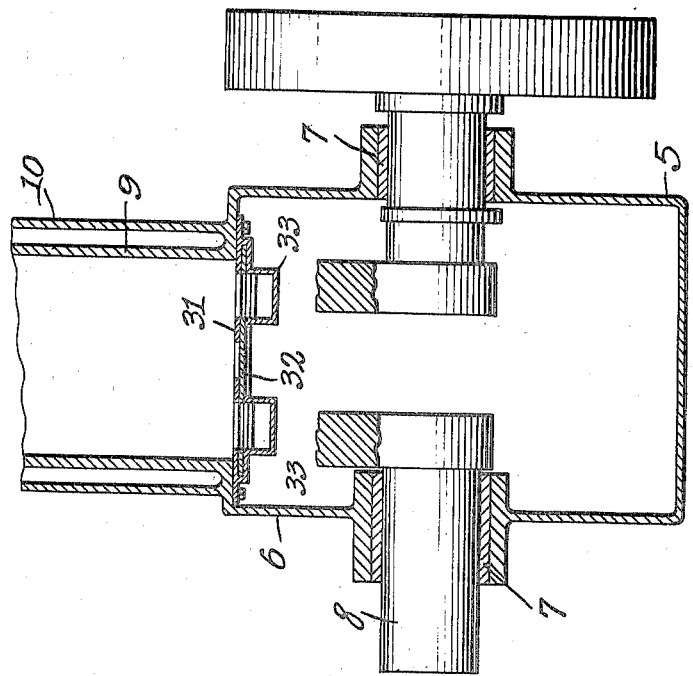
Graham Mayes INVENTOR.
BY
ATTORNEYS.

Patented Sept. 24, 1940

2,215,793

UNITED STATES PATENT OFFICE 2,215,793

INTERNAL COMBUSTION ENGINE

Graham Mayes, Philipsburg, Pa.

Application November 29, 1938, Serial No. 242,992

3 Claims. (Cl. 123—47)

This engine relates to internal combustion engines, and more particularly to internal combustion engines of the heavy oil burning type, wherein it is usually necessary to feed oil and air under high pressure to the cylinders of the engine.

It is therefore the primary object of the present invention to provide a heavy oil burning engine eliminating the use of the usual air pump, and providing means wherein the pistons of the engine will operate to draw the air into the cylinders through the crank casing thereof, and compress the air with the fuel which is forced into the cylinders, breaking up the fuel into fine particles and forming a highly combustible charge.

A further object of the invention is to provide a heavy oil burning engine having few exposed parts, and one wherein the working parts thereof are reduced to a minimum.

Another important object of the invention is to provide sliding air inlet valves operated by the lateral movement of the piston rod, the end that the operation of the valves is direct and positive at all times, insuring a true operation of the valves.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is a longitudinal sectional view through an engine constructed in accordance with the invention.

Figure 2 is a longitudinal sectional view taken at right angles to Figure 1.

Figure 3 is a sectional view taken on line 3—3 of Figure 2.

Figure 4 is a vertical sectional view through the engine, illustrating the valves as open or intake stroke of the piston.

Figure 5 is a sectional view taken on line 5—5 of Figure 4.

Figure 6 is a vertical sectional view through the engine illustrating the valves as closed and the piston on its compression stroke.

Figure 7 is a transverse sectional view taken on line 7—7 of Figure 6.

Figure 8 is a transverse sectional view taken on line 8—8 of Figure 6.

Figure 9 is a sectional view taken on line 9—9 of Figure 7.

Figure 10 is a sectional view taken on line 10—10 of Figure 7.

Figure 11 is a plan view of the slide valve controlling the air intake to the engine.

Referring to the drawings in detail, the reference character 5 designates the lower portion of the crank case of an internal combustion engine. The upper section of the crank case is indicated at 6, the sections 5 and 6 being formed with flanges whereby the sections may be securely bolted together, in the usual and well known manner.

Each of the sections is provided with shaft openings in which the bearings 7 are mounted, and in which the crank shaft 8 of the engine operates.

The engine cylinder which is indicated at 9, rises from the upper section 6 of the crank case, and is provided with the usual water jacket 10 through which the cooling liquid flows to maintain the cylinder cool.

Operating within the cylinder 9 is the piston 11, the piston embodying an upper section 12 and a lower section 13, the sections being hollow and bolted together by means of the bolt 14. The upper section of the piston is formed with an opening 15, in which the valve 16 operates, the valve being provided with a stem 17 moving through the bearing 18 carried by the arms 19, that in turn are bolted to the inner surface of the piston, as clearly shown by Figure 2 of the drawings.

The wrist pin is indicated by the reference character 20 and has its ends mounted in bearings formed in the lower section of the piston. The wrist pin 20 is formed with a cut-out portion in the upper edge thereof, for the reception of the head 21 formed at the upper end of the push rod 22, that operates through the connecting rod 23, the push rod moving through the bearing 24, secured within the connecting rod 23. The upper end of the connecting rod 23 is formed with lateral tubular extensions to receive the wrist pin 20 and permit of free pivotal movement of the connecting rod with respect to the wrist pin. At the lower end of the stem 17 of the valve 16, is a head 25 which is disposed in direct line with the head 21 with the result that as the push rod 22 moves upwardly, the head 21 will contact with the head 25 moving the valve stem 17 and valve 16 connected therewith upwardly, unseating the valve allowing air to pass upwardly into the upper portion of the cylinder. A coiled spring indicated by the reference character 26 is positioned on the stem 17 between the bearing 18 and head 25 thereof, to the end that the valve 16 is normally urged to its seat. On the lower end of the push rod 22 is a wheel 27 that moves over the integral cam 28 which is eccentrically formed on the crank shaft 8, so that as the crank shaft rotates, the push rod 22 will be reciprocated to operate the valve as previously described. A coiled spring indicated at 29 bears against the collar 30 secured at the lower end of the push rod to hold the wheel 27 into close engagement with the integral cam 28 at all times. The lower end of the cylinder is closed by the closure plate 31 the closure plate 31 embodying spaced walls providing a guide for the slide valve 32 which is shown as operating therein. The closure plate 31 and slide valve 32 are provided with ports which register during certain periods of the movements, of the valve allowing air to be drawn into the cylinder, through the registering ports on the compression stroke of the piston Pipes 33 extend into the upper section of the crank case and have their inner ends secured directly under the inlet ports of the closure plate 31, so that air drawn through the pipes 33 may enter the cylinder, when the ports of the closure plate register with the ports of the slide valve.

As clearly shown by Figure 1 of the drawings, the slide valve is provided with a socket member 34 in which the bearing member 35 operates, the bearing member having a curved surface to conform to the shape of the socket member. The bearing member 35 is carried by the connecting rod of the engine, in such a way that the connecting rod slides therethrough permitting of vertical movement of the connecting rod. Thus it will be seen that as the crank shaft of the engine rotates, reciprocating movement is imparted to the valve 32 whereby the valve is moved to its open and closed positions, as the lower end of the connecting rod swings with the crank shaft of the engine. With this movement of the connecting rod, it will be obvious that the valve member is opened and closed at predetermined intervals supplying the necessary air for proper combustion.

The cylinder head is indicated by the reference character 36 and is secured to the cylinder in the usual and well known manner. A valve indicated by the reference character 37 operates in the cylinder head and controls the passage of exhaust gases from the cylinder, through the exhaust manifold 38. This valve 37 has its stem extending upwardly through a bearing opening in the cylinder head, where it is provided with a disk 40 against which the coiled spring 41 engages, the spring acting to normally urge the valve 37 to its seat.

Mounted on the cylinder head is a rocker arm 42 that is engaged by the upper end of the push rod 43 which has its lower end extending into the crank case. Mounted on the lower end of the push rod is a wheel 44 that engages the cam 45 secured to the crank shaft 8 to rotate therewith. It will be obvious that as the cam 45 rotates the push rod 43 will be raised operating the valve to unseat the valve. It will of course be understood that the timing of the valve will be such as to release the exhaust at the proper time. Fuel oil enters the combustion chamber of the engine cylinder, through the nozzle 46, the heavy oil being fed through the pipe line 47 which is in communication with a suitable supply tank not shown.

As shown by Figure 1 of the drawings, the piston is at the top of the cylinder at the beginning of the power stroke. As the piston moves downwardly to the limit of its downward movement, the exhaust valve 37 opens under the action of the rocker arm 42 and push rod 43, as shown by Figure 4 of the drawings, freeing the cylinder of spent gases. Upon the return movement of the piston, the swinging movement of the connecting rod operates to open the slide valve 32 admitting air through the ports of the slide valve, to the cylinder below the piston 13. The cam 28 has moved under the roller 27 lifting the push rod 22 and valve 16, permitting the air to pass through the outer end of the cylinder between the piston and cylinder where it mixes with the oil which is sprayed into the cylinder, through the nozzle 46 on the compression of the charge, thereby producing a highly combustible charge for firing.

While I have shown and described an engine embodying a single cylinder, it is to be understood that the principle of the invention may be carried out in a multi-cylinder engine, without departing from the spirit of the invention.

What is claimed is:

1. An internal combustion engine comprising a cylinder, a crank casing at one end of the cylinder, a connecting rod, air inlet manifolds extending into the crank casing, a slide valve operated adjacent to the discharge end of the air inlet manifolds, the connecting rod passing through the valve, and adapted to move the valve by the swinging movement of the connecting rod, a valve in the piston for controlling the passage of air through the piston to the upper end of the cylinder, means controlled by the connecting rod for operating the latter valve, and means for directing fuel under pressure to the cylinder.

2. An internal combustion engine comprising a cylinder, a crank casing at one end of the cylinder, a hollow piston operating within the cylinder, an air inlet manifold extending into the crank casing, a valve controlling the passage of air into the lower end of the cylinder, said valve being operated by the swinging movements of the connecting rod of the piston, a crank shaft to which the connecting rod of the piston is connected, a valve adapted to control the passage of air through the piston, means including a vertically sliding rod operated by the movement of the crank shaft controlling the latter valve, and means for directing fuel under pressure to the cylinder.

3. An internal combustion engine comprising a cylinder, a crank casing at one end of the cylinder, a crank shaft operating within the crank casing, a hollow piston operating within the cylinder, a valve member operating in the piston and controlling communication between the interior of the piston and cylinder, a hollow connecting rod connecting the crank shaft and piston, a reciprocating rod operating through the hollow connecting rod and adapted to engage said valve, opening the valve and admitting air to the cylinder beyond the piston, a cam on the crank shaft operating said rod as the crank shaft operates, and slide valves operated by the swinging movement of the connecting rod for controlling the passage of air to the piston.

GRAHAM MAYES.